United States Patent
Nishijima et al.

(10) Patent No.: US 10,909,873 B2
(45) Date of Patent: Feb. 2, 2021

(54) SMART TUTORIAL THAT LEARNS AND ADAPTS

(71) Applicants: Nissan North America, Inc., Franklin, TN (US); Renault S.A.S., Boulogne-Billancourt (FR)

(72) Inventors: David M. Nishijima, San Jose, CA (US); Lionel Cordesses, Cupertino, CA (US); Simon Hougard, Cupertino, CA (US)

(73) Assignees: Nissan North America, Inc., Franklin, TN (US); Renault S.A.S., Boulogne-Billancourt (FR)

( * ) Notice: Subject to any disclaimer, the term of this patent is extended or adjusted under 35 U.S.C. 154(b) by 258 days.

(21) Appl. No.: 16/116,358

(22) Filed: Aug. 29, 2018

(65) Prior Publication Data
US 2019/0012927 A1 Jan. 10, 2019

Related U.S. Application Data

(63) Continuation of application No. 15/224,378, filed on Jul. 29, 2016, now Pat. No. 10,083,620.

(51) Int. Cl.
*G09B 9/04* (2006.01)
*G09B 9/042* (2006.01)
(Continued)

(52) U.S. Cl.
CPC .......... *G09B 9/042* (2013.01); *G09B 19/167* (2013.01); *B60R 21/0134* (2013.01); *G06K 9/00* (2013.01);
(Continued)

(58) Field of Classification Search
CPC ....... G09B 9/042; G09B 19/167; H04W 4/90; H04W 4/023; H04W 24/00;
(Continued)

(56) References Cited

U.S. PATENT DOCUMENTS 9,376,117 B1  6/2016 Parundekar et al.
9,674,880 B1*  6/2017 Egner .................. A61B 5/1451
(Continued)

FOREIGN PATENT DOCUMENTS

CN      1470044 A    1/2004
CN    102310856 A    1/2012
(Continued)

OTHER PUBLICATIONS

Extended European Search Report of corresponding applicaton EP 17834885.0; dated Dec. 19, 2019; 8 pages.
(Continued)

*Primary Examiner* — Behrang Badii
(74) *Attorney, Agent, or Firm* — Young Basile Hanlon & MacFarlane, P.C.

(57) ABSTRACT

An adaptive smart tutorial that assists in operating a vehicle is described. A situational profile for the vehicle including driver identity data is generated. The driver identity data includes respective usage frequency values corresponding to a plurality of assistance instructions. The situational profile is compared to a plurality of assistance profiles including aggregate identity data corresponding to the driver identity data, Based on the comparison, a plurality of similarity values corresponding to the plurality of assistance profiles indicating a level of similarity between the situational profile for the vehicle and a respective assistance profile of the plurality of assistance profiles is generated. An assistance instruction of the plurality of assistance instructions is selected depending upon a similarity value and a usage frequency value that corresponds to the assistance instruction. The assistance instruction is associated with one or more control system inputs for changing a control state of the vehicle.

20 Claims, 8 Drawing Sheets

(51) Int. Cl.
*G09B 19/16* (2006.01)
*G06K 9/00* (2006.01)
*G08G 1/16* (2006.01)
*H04W 4/02* (2018.01)
*H04W 24/00* (2009.01)
*B60R 21/0134* (2006.01)
*H04W 4/90* (2018.01)
*H04N 7/18* (2006.01)
*G06K 9/20* (2006.01)

(52) U.S. Cl.
CPC ..... *G06K 9/00791* (2013.01); *G06K 9/00798* (2013.01); *G06K 9/2027* (2013.01); *G08G 1/167* (2013.01); *H04N 7/18* (2013.01); *H04W 4/023* (2013.01); *H04W 4/90* (2018.02); *H04W 24/00* (2013.01)

(58) Field of Classification Search
CPC .. B60R 21/0134; G06K 9/00; G06K 9/00791; G06K 9/00798; G06K 9/2027; G08G 1/167; H04N 7/18
See application file for complete search history.

(56) References Cited

U.S. PATENT DOCUMENTS

| | | | |
|---|---|---|---|
| 2003/0096594 A1* | 5/2003 | Naboulsi | B60R 11/02 455/411 |
| 2010/0036562 A1 | 2/2010 | Becker | |
| 2011/0044507 A1* | 2/2011 | Strauss | G01S 13/867 382/103 |
| 2012/0283894 A1* | 11/2012 | Naboulsi | A61B 5/18 701/1 |
| 2012/0309424 A1* | 12/2012 | Xiao | H04W 4/023 455/456.3 |
| 2013/0251208 A1* | 9/2013 | Kuehnle | G06K 9/00791 382/104 |
| 2014/0012456 A1 | 1/2014 | Syed et al. | |
| 2015/0044641 A1 | 2/2015 | Chauncey et al. | |
| 2015/0088375 A1 | 3/2015 | Lee et al. | |
| 2015/0191122 A1 | 7/2015 | Roy et al. | |
| 2015/0274162 A1 | 10/2015 | Sato | |
| 2017/0208540 A1* | 7/2017 | Egner | H04W 40/10 |

FOREIGN PATENT DOCUMENTS

| | | |
|---|---|---|
| CN | 104512423 A | 4/2015 |
| CN | 104768130 A | 7/2015 |
| JP | 2013079076 A | 5/2013 |
| KR | 101555444 B1 | 10/2015 |
| WO | 2014042571 A1 | 3/2014 |
| WO | 2014076759 A1 | 5/2014 |

OTHER PUBLICATIONS

Chinese Office Action of corresponding application CN 201780054130.5; dated Nov. 12, 2019; 13 pages with translation.

Tesla Model S Owner's Manual, https://www.teslamotors.com/sites/default/files/Model-S-Owners-Manual.pdf, 2013.

Video: FCA and Tweddle launch Uconnect user guide, http://telematicsnews.info/2015/10/28/video-fca-and-tweddle-launch-uconnect-video-guide_o6281/, Oct. 28, 2015.

Hyundai Virtual Guide app updates the car owner's manual, http://www.gizmag.com/hyundai-introduces-3d-augmented-reality-owners-manuals/40339/, Nov. 11, 2015.

* cited by examiner

SMART TUTORIAL THAT LEARNS AND ADAPTS

CROSS-REFERENCE TO RELATED APPLICATION

This application is a continuation of U.S. patent application Ser. No. 15/224,378, filed Jul. 29, 2016, the entire content of which is incorporated herein by reference.

TECHNICAL FIELD

This application relates to vehicle operation, including methods, apparatuses, and non-transitory computer readable media for vehicle operation including an adaptive smart tutorial.

BACKGROUND

Vehicles are often accompanied by some type of reference material, commonly a printed owner's manual that lists and describes various features and attributes of the vehicle. More recently, owner's manuals have been provided in an electronic form that offers the convenience of an electronically searchable version of the printed owner's manual.

However, it is often the case that the owner's manual, whether in paper form or electronic form, is rarely if ever viewed. When a user does consult the owner's manual, it may only be to diagnose a specific problem, or interpret a specific indication or warning provided by the vehicle. As such, many features of the vehicle (especially newer or more advanced features) remain unused, or if used, are used infrequently or ineffectively.

SUMMARY

Disclosed herein are aspects, features, elements, implementations, and implementations of a smart tutorial that learns and adapts based on driver interaction with a vehicle. The smart tutorial can be used for operating the vehicle.

An aspect of the disclosed implementations is a method of operating a vehicle. The method includes generating a situational profile for the vehicle including driver identity data, wherein the driver identity data includes respective usage frequency values corresponding to a plurality of assistance instructions, comparing the situational profile for the vehicle to a plurality of assistance profiles including aggregate identity data corresponding to the driver identity data, generating, based on the comparison between the situational profile for the vehicle and the plurality of assistance profiles, a plurality of similarity values corresponding to the plurality of assistance profiles indicating a level of similarity between the situational profile for the vehicle and a respective assistance profile of the plurality of assistance profiles, and selecting an assistance instruction of the plurality of assistance instructions depending upon a similarity value of the plurality of similarity values and a usage frequency value that corresponds to the assistance instruction, wherein the assistance instruction is associated with one or more control system inputs for changing a control state of the vehicle.

An aspect of the disclosed implementations includes an apparatus for operating a vehicle. The apparatus comprises a non-transitory memory, and a processor configured to execute instructions stored in the non-transitory memory. The instructions include instructions to generate a situational profile for the vehicle including driver identity data, wherein the driver identity data includes respective usage frequency values corresponding to a plurality of assistance instructions, compare the situational profile for the vehicle to a plurality of assistance profiles including aggregate identity data corresponding to the driver identity data, generate, based on the comparison between the situational profile for the vehicle and the plurality of assistance profiles, a plurality of similarity values corresponding to the plurality of assistance profiles indicating a level of similarity between the situational profile for the vehicle and a respective assistance profile of the plurality of assistance profiles, and select an assistance instruction of the plurality of assistance instructions depending upon a similarity value of the plurality of similarity values and a usage frequency value that corresponds to the assistance instruction, wherein the assistance instruction is associated with one or more control system inputs for changing a control state of the vehicle.

An aspect of the disclosed implementations is a non-transitory computer-readable storage medium including program instructions executable by one or more processors that, when executed, cause the one or more processors to perform operations. The operations include generating a situational profile for the vehicle including driver identity data, wherein the driver identity data includes respective usage frequency values corresponding to a plurality of assistance instructions, comparing the situational profile for the vehicle to a plurality of assistance profiles including aggregate identity data corresponding to the driver identity data, selecting an assistance instruction of the plurality of assistance instructions depending upon a result of comparing the situational profile to the plurality of assistance profiles and a usage frequency value that corresponds to the assistance instruction, wherein the assistance instruction is associated with one or more control system inputs for changing a control state of the vehicle, generating an assistance indication corresponding to the assistance instruction, the assistance indication accessible to a driver of the vehicle, detecting a feedback input that reflects a change in the control state of the vehicle, determining whether the feedback input is in accordance with the assistance indication based at least in part on the feedback input occurring before a predetermined time period has elapsed after generating the assistance indication, and, in response to the feedback input being in accordance with the assistance instruction, converting the situational profile for the vehicle into a format that corresponds to the plurality of assistance profiles and adding the situational profile to the plurality of assistance profiles.

These and other aspects of the present disclosure are disclosed in the following detailed description of the embodiments, the appended claims, and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
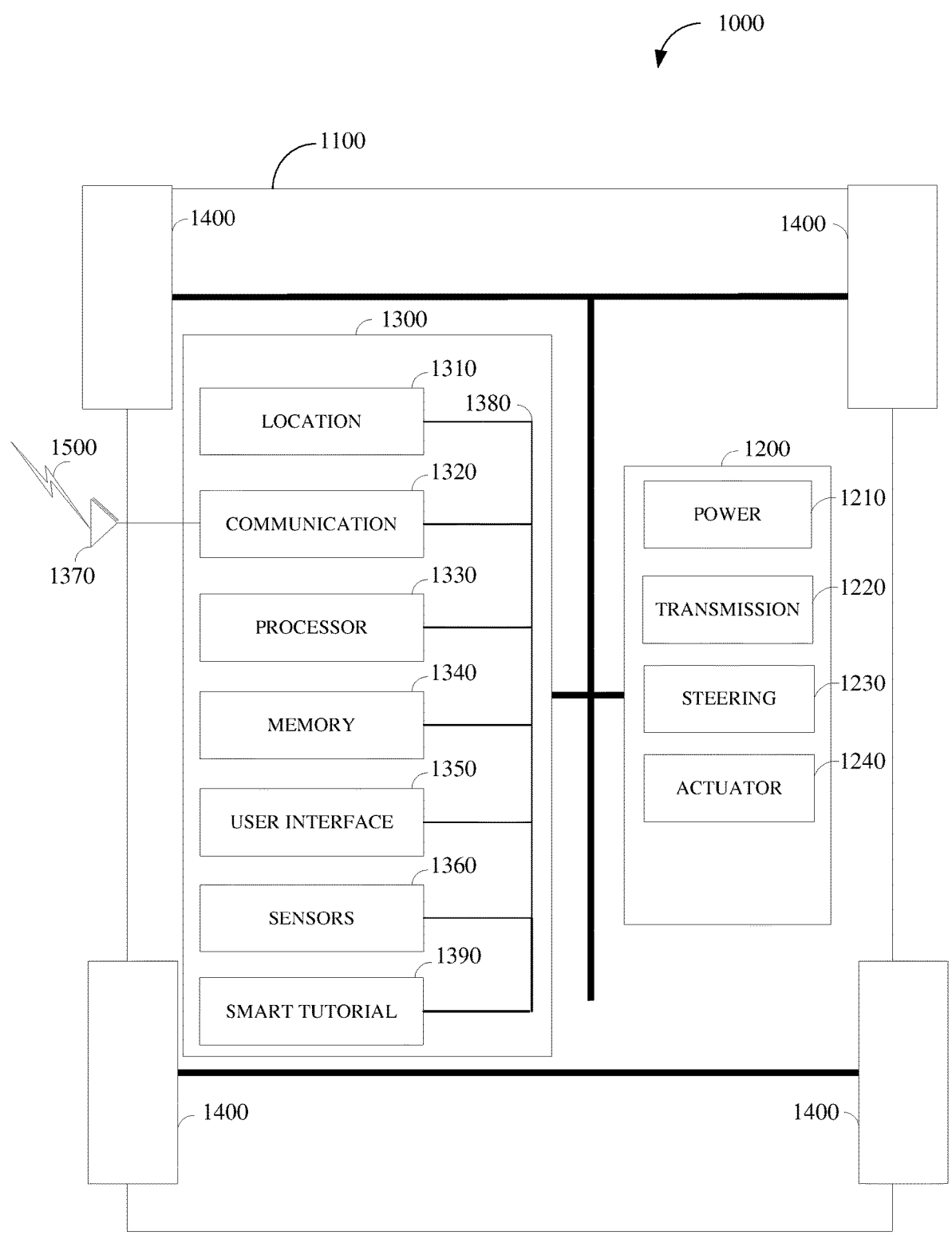
FIG. 1 is a diagram of an example of a portion of a vehicle in which the aspects, features, and elements disclosed herein may be implemented.

A vehicle is a complex system that integrates mechanical and electronic features into a single unified system, mastery of which may require a substantial investment in time. The ordinary ways of learning to operate a vehicle, such as through familiarization with a vehicle manual, taking driving lessons, or simple trial and error are variously inefficient, ineffective, or inconvenient.

As such, there is a need for a better way to instruct a driver in the use of the many features of a vehicle. Ideally, the driver would be taught in a manner that is intuitive and delivers relevant lessons at the appropriate time and under the appropriate circumstances. In this way, the driver's knowledge of the vehicle would be enhanced in a convenient manner. Additionally, the performance of the vehicle could be improved through more optimal use of previously under-utilized features.

Accordingly, the disclosed technology is able to provide the advantages of a smart tutorial that learns and adapts to both the driver and the environment in real-time. The disclosed technology includes a smart tutorial apparatus designed to improve a driver's operation of a vehicle through tutorials. Further, the disclosed technology leverages a host of advantages including computer learning, data mining, real-time data analysis, and real-time processing of sensory inputs, to provide the driver with an improved driving experience in which the driver is presented with the opportunity to learn relevant features of the vehicle in a convenient manner.

As used herein, the terminology "computer" or "computing device" includes any unit, or combination of units, capable of performing any method, or any portion or portions thereof, disclosed herein.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, or multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine", "identify", and "generate", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of a vehicle 1000 in which the aspects, features and elements disclosed herein may be implemented. FIG. 1 illustrates that the vehicle 1000 includes a chassis 1100, a powertrain 1200, a controller 1300, wheels 1400, or any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300 and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 may include a power source 1210, a transmission 1220, a steering unit 1230, an actuator 1240, or any other element or combination of elements of a powertrain, such as a suspension, a drive shaft, axles or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some implementations, the power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300, the actuator 1240, or both. The steering unit 1230 may be controlled by the controller 1300, the actuator 1240, or both, and may control the wheels 1400 to steer the vehicle 1000. The vehicle actuator 1240 may receive signals from the controller 1300 and may actuate or control the power source 1210, the transmission 1220, the steering unit 1230, or any combination thereof to operate the vehicle 1000.

As illustrated in FIG. 1, the controller 1300 may include a location unit 1310, an electronic communication unit 1320, a processor 1330, a memory 1340, a user interface 1350, sensor 1360, an electronic communication interface 1370, a smart tutorial unit 1390, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, the smart tutorial unit 1390, or any combination thereof, may be integrated in one or more electronic units, circuits or chips.

In some implementations, the processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the smart tutorial unit 1390, the powertrain 1200, or any combination thereof. For example, the processor may be operatively coupled with the memory 1340 via a communication bus 1380.

The memory 1340 may include any tangible non-transitory computer-usable or computer-readable medium capable of, for example, containing, storing, communicating, or transporting machine-readable instructions, or any information associated therewith, for use by or in connection with the processor 1330. The memory 1340 may be, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

In some implementations, as illustrated in FIG. 1, a portion of the memory 1340 may be coupled to a smart tutorial unit 1390 via the communication bus 1380. The smart tutorial unit 1390 may include specialized instructions for operating the vehicle 1000, communicating with remote data sources, determining the state of the vehicle 1000, determining the state of objects external to the vehicle 1000, selecting assistance instructions, generating or providing assistance indications, providing tutorials, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface 1370 may be configured to communicate via multiple communication links.

The communication unit 1320 may be configured to transmit or receive signals via the wired or wireless medium 1500, such as via the communication interface 1370. Although not explicitly shown in FIG. 1, the communication unit 1320 may be configured to transmit, receive, or both, via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS)

enabled National Marine Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person and/or a touch display for performing visual and touch-based communication with the person.

The sensor 1360 often includes one or more sensor 1360, such as an array of sensors, which may be operable to provide information that may be used to control the vehicle 1000. The sensor 1360 may provide information regarding current operating characteristics of the vehicle. When multiple sensors 1360 are included, they can include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some implementations, the sensor 1360 may include one or more sensors that are operable to obtain information regarding the state of the physical environment inside the vehicle 1000 and the physical environment external to the vehicle 1000. For example, one or more of sensors 1360 may detect road geometry and obstacles, such as fixed obstacles, vehicles and pedestrians. In some implementations, the sensor 1360 can be or include one or more video cameras, laser-sensing systems, infrared-sensing systems, acoustic-sensing systems, light sensors, heat sensors, moisture sensors, vibration sensing systems, electric current sensing systems, capacitive sensing systems, resistive sensing systems, or any other suitable type of on-vehicle environmental sensing device, or combination of devices, now known or later developed. In some implementations, the sensor 1360 and the location unit 1310 may be combined.

Although not shown separately, in some implementations, the vehicle 1000 may include a trajectory controller. The trajectory controller may be operable to obtain information describing a current state of the vehicle 1000 and a route planned for the vehicle 1000, and, based on this information, to determine and optimize a trajectory for the vehicle 1000. In some implementations, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some implementations, the optimized trajectory can be control inputs such as a set of steering angles, with each steering angle corresponding to a point in time or a position. In some implementations, the optimized trajectory can be one or more lanes, lines, curves, paths, or a combination thereof. The trajectory controller may be implemented, at least in part, using one or more elements of the controller 1300.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, the vehicle 1000 may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
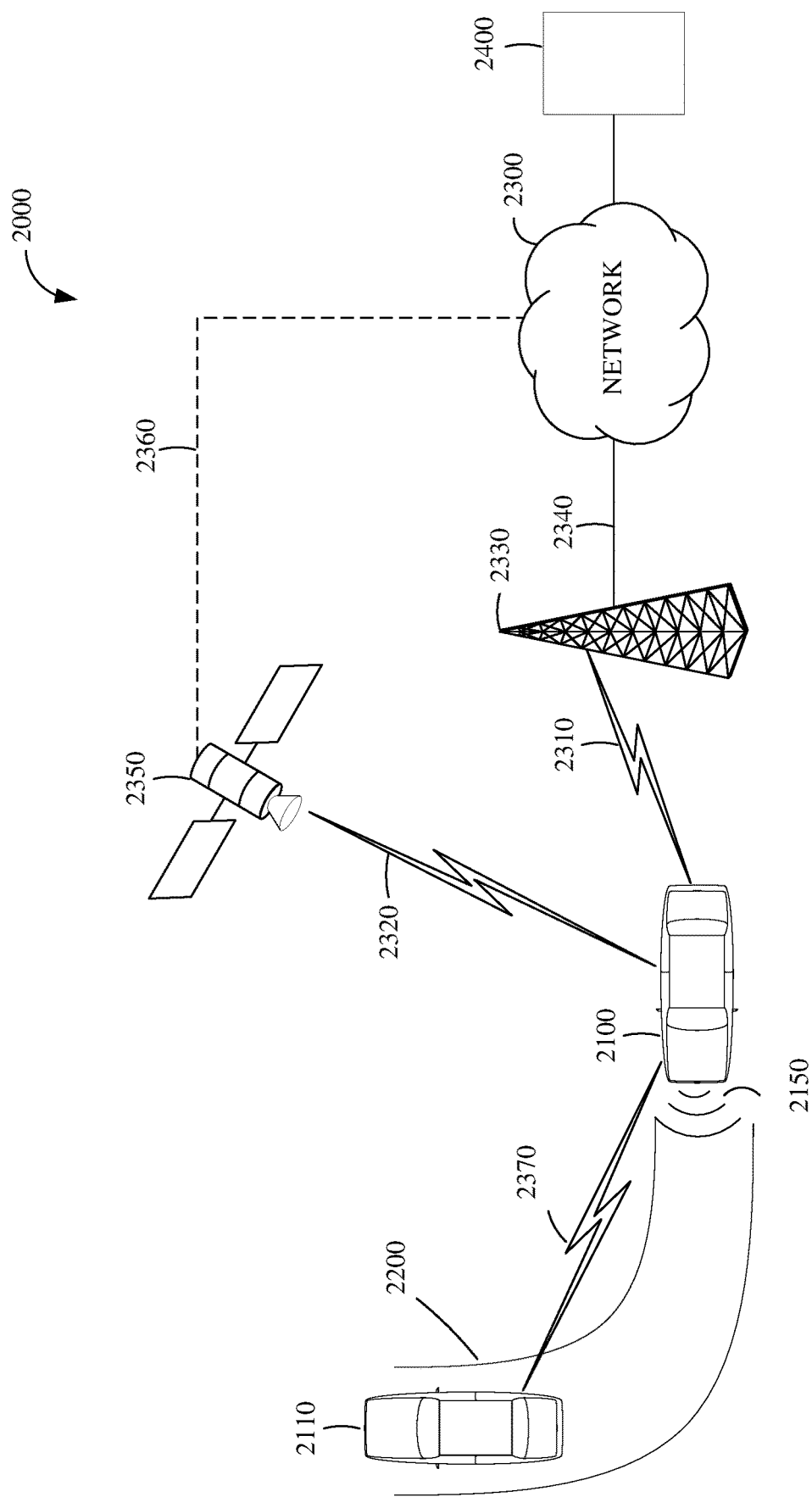
FIG. 2 is a diagram of an example of a portion of a vehicle transportation and communication system in which the aspects, features and elements disclosed herein may be implemented.

FIG. 2 is a diagram of an example of a portion of a vehicle transportation and communication system in which the aspects, features and elements disclosed herein may be implemented. The vehicle transportation and communication system 2000 may include at least two vehicles 2100/2110, each of which may be configured similarly to the vehicle 1000 shown in FIG. 1, which travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area. In an implementation, the one or more vehicle transportation networks may include roads, streets, highways, thoroughfares, paths, routes, or any surface that may be traversed by a vehicle such as vehicle 1000.

In some implementations, the electronic communication network 2300 may be, for example, a multiple access system and may provide for communication, such as voice communication, data communication, video communication, messaging communication, or a combination thereof, between each vehicle 2100/2110 and one or more communicating devices 2400. For example, a vehicle 2100/2110 may receive information, such as information representing the vehicle transportation network 2200, from a communicating device 2400 via the network 2300. In certain implementations described herein, the electronic communication network 2300 can be used in vehicle-to-vehicle communication of the basic safety message containing location and trajectory information of the vehicle 2100. Each vehicle 2100/2110 may also communicate this information directly to one or more other vehicles as discussed in more detail below.

In some implementations, a vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

In some implementations, a vehicle 2100/2110 may communicate with another vehicle 2100/2110. For example, a host, or subject, vehicle (HV) 2100 may receive one or more automated inter-vehicle messages, such as the basic safety message, from a remote, or target, vehicle (RV) 2110, via a direct communication link 2370, or via the network 2300. For example, the remote vehicle 2110 may broadcast the message to host vehicles within a defined broadcast range, such as 300 meters. In some implementations, the host vehicle 2100 may receive a message via a third party, such as a signal repeater (not shown) or another remote vehicle (not shown). In some implementations, a vehicle 2100/2110 may transmit one or more automated inter-vehicle messages periodically based on a defined interval, such as 100 milliseconds.

Automated inter-vehicle messages may include vehicle identification information, spatial state information, such as longitude, latitude and/or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmitting vehicle is in a neutral state, a parked state, a forward state or a reverse state.

Some or all of the above information regarding the host vehicle 2100 and/or the remote vehicle 2110 may be received from sensors and not from automated inter-vehicle messages. As one example, the communication unit 1320 can receive SONAR, RADAR, and/or LIDAR signals from which vehicle position, speed, acceleration and instantaneous heading can be calculated.

In some implementations, the vehicle 2100 may communicate with the communication network 2300 via an access point 2330. The access point 2330, which may include a computing device, may be configured to communicate with a vehicle 2100, with a communication network 2300, with one or more communication devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

In some implementations, the vehicle 2100 may communicate with the communication network 2300 via a satellite 2350, or other non-terrestrial communication device. The satellite 2350, which may include a computing device, may be configured to communicate with the vehicle 2100, with the communication network 2300, with one or more communication devices 2400, or with a combination thereof via one or more communication links 2320/2360. Although shown as a single unit, a satellite may include any number of interconnected elements.

The vehicle 2110 may similarly communicate with the communication network 2300 via the access point 2330 and/or the satellite 2350.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some implementations, a vehicle 2100 may identify a portion or condition of the vehicle transportation network 2200. For example, the vehicle may include one or more on-vehicle sensors 2150, such as sensor 1360 shown in FIG. 1, which may include a speed sensor, a wheel speed sensor, a camera, a gyroscope, an optical sensor, a laser sensor, a radar sensor, a sonic sensor, an accelerometer, or any other sensor or device or combination thereof capable of determining or identifying a portion or condition of the vehicle transportation network 2200.

In some implementations, a vehicle 2100 may traverse a portion or portions of one or more vehicle transportation networks 2200 using information communicated via the network 2300, such as information representing the vehicle transportation network 2200, information identified by one or more on-vehicle sensors 2150, or a combination thereof.

Although, for simplicity, FIG. 2 shows one vehicle transportation network 2200, one electronic communication network 2300, and one communication device 2400, any number of networks or communication devices may be used. In some implementations, the vehicle transportation and communication system 2000 may include devices, units or elements not shown in FIG. 2. Although each vehicle 2100/2110 is shown as a single unit, a vehicle may include any number of interconnected elements.

Although the vehicle 2100 is shown communicating with the communication device 2400 via the network 2300, the vehicle 2100 and/or the vehicle 2110 may communicate with the communication device 2400 via any number of direct or indirect communication links. For example, each vehicle 2100/2110 may communicate with the communication device 2400 via a direct communication link, such as a Bluetooth communication link.

The steps, or operations, of any method, process, or algorithm described in connection with the implementations of the disclosed technology herein, may be implemented in hardware, firmware, software executed by hardware, circuitry, or any combination thereof. To facilitate explanation, method 3000 is depicted and described as a series of steps. However, the steps in accordance with this disclosure may occur in various orders or concurrently. Additionally, operations in accordance with this disclosure may occur with other operations not presented and described herein.

Figure 3:
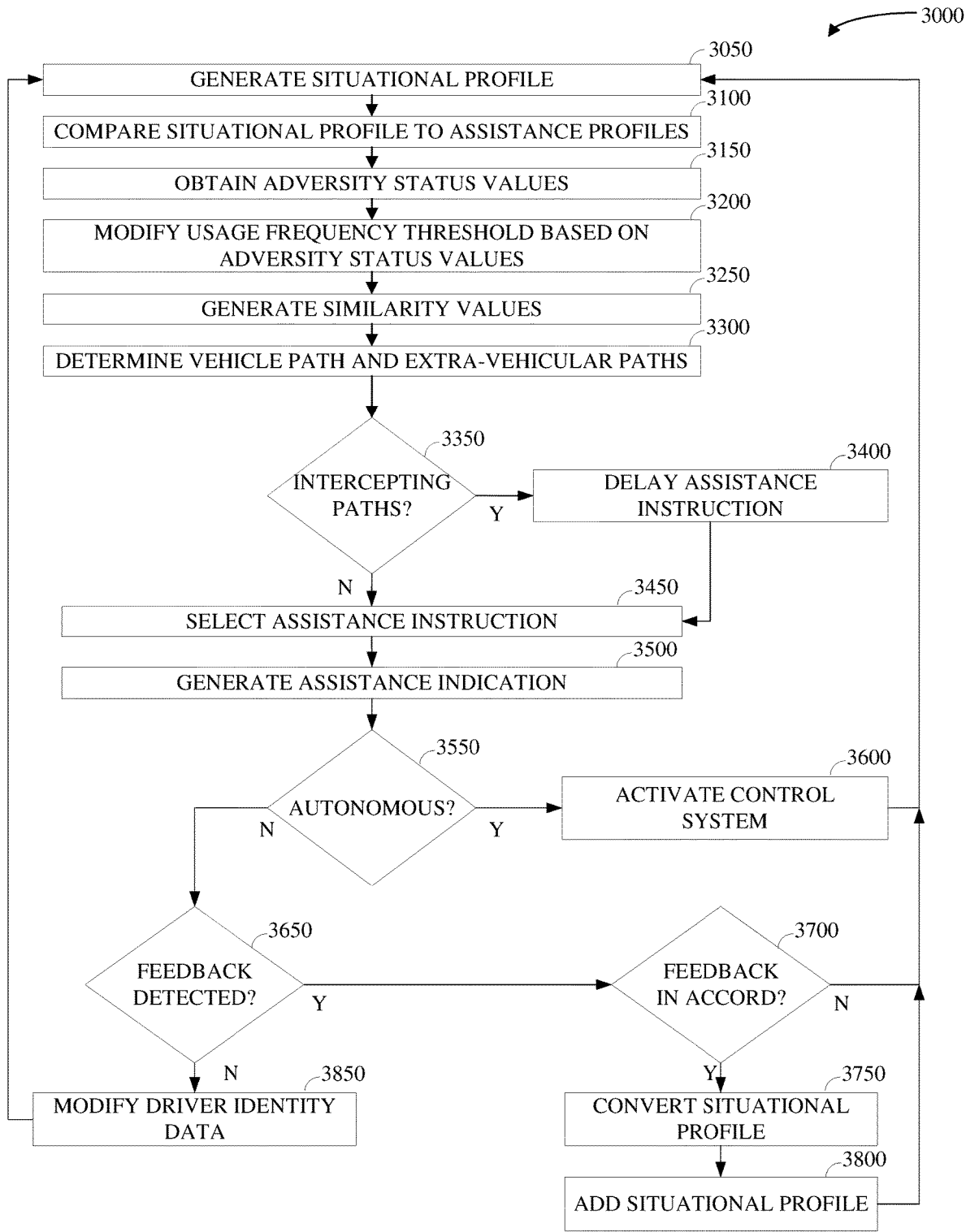
FIG. 3 is a flow chart of a method for a smart tutorial that learns and adapts according to the teachings herein.

FIG. 3 is a flow chart of a method for a smart tutorial that learns and adapts according to the teachings disclosed herein. In some implementations, the method for a smart tutorial that learns and adapts may be implemented in a vehicle, such as the vehicle 1000 shown in FIG. 1, or the vehicles 2100/2110 shown in FIG. 2. In some implementations the method for a smart tutorial that learns and adapts may be implemented in a computing device or computing apparatus such as the controller 1300 shown in FIG. 1. In an implementation, some or all aspects of the method for a smart tutorial that learns and adapts may be implemented in a system combining some or all of the features described herein.

Method 3000 begins at step 3050, where the vehicle 1000 generates a situational profile comprising driver identity data, vehicle state data, and extra-vehicular state data. In this example, the identity data for vehicle 1000 may indicate that the vehicle is driven by an experienced driver, the vehicle state data may indicate that the velocity of vehicle 1000 is 100 km/h, and the extra-vehicular state data may indicate, based on sensor 1360, the location of buildings within range of sensor 1360. Further, communication unit 1320 may provide an indication, through a connection with a remote traffic server computing device, that the road is free from traffic or construction for the next 20 kilometers if the present course of travel is continued.

In an implementation, the driver identity data includes: identifying information about the driver of vehicle 1000, such as the drivers name; the drivers experience based on past usage of the vehicle; the configuration of vehicle systems associated with the driver such as preferred steering position, seating position, or ride setting; the drivers movement pattern data such as the locations the driver has driven to and the time the locations were visited; and driver schedule data including the state of the vehicle and the environment at previous times that the driver has used the vehicle.

In an implementation, the driver identity data includes a plurality of usage frequency values that correspond to a plurality of assistance instructions. In an implementation, the plurality of assistance instructions include instructions generated by the vehicle 1000, which may be provided to the driver as an assistance indication. In an implementation, assistance instructions include instructions or recommendations to activate or deactivate one or more of the control systems in vehicle 1000, such as the headlights, braking, intelligent cruise control, assistive braking, entertainment system, or any control system including a control system that can be controlled by a control apparatus such as controller 1300 or powertrain 1200. In an implementation, the assistance instructions may include tutorials instructing the driver in the use of the control systems or the use of vehicle 1000.

In an implementation, the assistance instructions may include instructions not to allow use of one or more of the control systems and may be accompanied by an assistance indication such as an audible explanation of why the control system is not available for use or why use of the control system is allowed but contraindicated. In an implementation, an assistance instruction may indicate that a control system such as cruise control system is not available in a particular environment such as an enclosed parking garage. In an implementation, the assistance instruction may be accompanied by an assistance indication in the form of an audible indication that the selected control system, which in this implementation is a cruise control system, is preferably used on an open road such as a highway.

In an implementation the plurality of usage frequency values may be based on the selection or determination of a plurality of assistance instructions by the vehicle 1000 or the activation or deactivation of one of the control systems by the driver in response to an assistance instruction. In an implementation, the usage frequency values may correspond to one or more of the plurality of assistance instructions and the usage frequency values may be modified based on: the provision or usage of the assistance instructions; the total number of times an assistance instruction has been provided or used; the most recent time an assistance instruction has been provided or used; or the frequency with which an assistance instruction has been provided or used. In an implementation, the usage frequency values may be a numerical value and the vehicle 1000 may track the usage frequency values as well as incrementing or decrementing the usage frequency values in response to an assistance instruction being provided to a driver or used by the driver.

In an implementation, the driver identity data may be associated with: an input from a vehicle access device such as a key or mobile computing device; or a biometric sensor reading such as a fingerprint or voiceprint biometric sensor. In an implementation, the vehicle 1000 may maintain separate driver identity data for multiple drivers based on the driver's association with a vehicle access device or biometric sensor reading.

In an implementation, the vehicle state data is based on vehicle control states for a vehicle which include the state of a vehicle at various points in time including the times when the vehicle is in operation. The vehicle state data includes data relating to the state of the vehicle including the velocity, orientation, and geographic location of the vehicle, the state of the control systems, and the state of the components in the vehicle including diagnostic information. In an implementation, the vehicle state data includes data from sensor 1360 including: the internal state of the vehicle 1000 such as the temperature inside the vehicle 1000 including the temperature inside the cabin or passenger compartment; the amount of light inside the vehicle 1000 including light entering the vehicle 1000 from outside the vehicle 1000; or the sound level inside the vehicle 1000.

In an implementation, the extra-vehicular state data is based on extra-vehicular object states corresponding to one or more extra-vehicular objects. The extra-vehicular states include states that correspond to any object that is external to the vehicle. In an implementation, the extra-vehicular states include any data collected by sensor 1360 from a source external to the vehicle 1000. In an implementation, the extra-vehicular states include: the state of the environment including weather conditions such as temperature information, or precipitation information; the geographical location such as may be gathered through communication unit 1320; topographical features as may be determined by sensor 1360 or through data gathered such as through communication unit 1320; or the state of any surface, such as a roadway within the range of sensor 1360 or through data gathered by controller 1300 from a local data source such as memory 1340, or a remote data source external to the vehicle 1000.

In an implementation, the extra-vehicular states include the state, such as the positon, orientation, or velocity, of various objects in the environment such as extra-vehicular objects including structures, vehicles, pedestrians, and any other animate objects or inanimate object external to the vehicle 1000.

In step 3100, the vehicle 1000 compares the situational profile to a plurality of assistance profiles. In an implementation, the plurality of assistance profiles is based on aggregate identity data, aggregate vehicular state data, or aggregate extra-vehicular state data. The comparison between the situational profile and the plurality of assistance profiles may include a comparison of some or all portions of the respective identity data, aggregate identity data, vehicular data, aggregate vehicular data, extra-vehicular data, or aggregate extra-vehicular data. In an implementation, the comparison of the situational profile to the plurality of assistance profiles includes a comparison of attributes and values of the data in the situational profile to attributes and values of the data in the plurality of assistance profiles. Additionally, the comparison includes comparisons of attributes and values in the situational profile to the average, mean, mode, or median of attributes or values in the plurality of assistance profiles.

In an implementation, the aggregate identity data includes an aggregation of driver identity data from one or more drivers and may include the driver identity data from the driver of the vehicle 1000. Additionally, the aggregate identity data may include identity relationship data based on the relationships between various attributes in: the driver data; the aggregate identity data; the aggregate vehicular state data; or the aggregate extra-vehicular state data. In an implementation, the comparison may be based on the relationship data.

In an implementation, the aggregate vehicular state data corresponds to the vehicle state data and includes attributes and corresponding values from a plurality of vehicle states as described with respect to the vehicle state data. Additionally, the aggregate vehicular state data includes vehicle relationship data based on the relationship between the attributes in the vehicle state data.

In an implementation, the aggregate extra-vehicular state data corresponds to the extra-vehicular state data, and includes attributes from a plurality and values of extra-vehicular states as described with respect to the extra-vehicular state data. Additionally, the extra-vehicular state data includes extra-vehicular relationship data based on the relationship between various attributes in the extra-vehicular state data.

In an implementation, the plurality of assistance profiles corresponds to the plurality of assistance instructions. In an implementation, the plurality of assistance profiles includes portions of the aggregate identity data, aggregate vehicular data, or the aggregate extra-vehicular data that correspond to at least one of the assistance instructions from the plurality of assistance instructions.

In step 3150, the vehicle 1000 obtains an adversity status value from one or more remote computing devices, such as a server computing device which may be accessed, via communication unit 1320, through a network connection including a wireless network connection such as a cellular network or network 2300. In an implementation, the adversity status value is based on adversity factor data relating to past events or current states that effect the vehicle 1000 or the environment surrounding vehicle 1000.

In an implementation, the adversity factor data includes: geographical condition data including the location; topographical conditions in a predetermined area around the vehicle; weather data including the current weather conditions and weather forecasts; traffic condition data including the state of current traffic, past traffic patterns, and predicted traffic at various predetermined future times; traffic incident data including a record of past traffic incidents or road incidents on a portion of the vehicle transportation network; vehicle transportation network data including road closure information, construction information, vehicle stoppage information, traffic regulations such as speed limits, and zoning data such as for school zones or residential zones; or historical usage data including records, such as written, photographic, video, or audio records, of past events in a portion of the vehicle transportation network that is within a predetermined distance of vehicle 1000.

In an implementation, one or more adversity status values may be stored in local storage, such as in memory 1340, and the one or more adversity status values may be obtained from the local storage, the remote computing devices, or a combination of the local storage and remote computing devices.

In step 3200, the vehicle 1000 modifies or adjusts the usage frequency threshold value based on the adversity status value. In an implementation, the modification or adjustment of the usage frequency value is performed so that the usage frequency threshold value is increased or decreased in relation to the adversity status value.

In another implementation, the usage frequency threshold values may be modified on a weighted or proportional basis such that a usage frequency value corresponding to one assistance instruction may be impacted more or less significantly than a usage frequency value for another assistance instruction.

In this way, by increasing or decreasing the usage frequency value, the vehicle 1000 may increase or decrease the likelihood of an assistance instruction being selected when a situational profile matches an assistance profile.

In step 3250, the vehicle 1000 generates similarity values for the plurality of assistance profiles, which in an implementation is based on the comparison between the situational profile and the plurality of assistance profiles. In an implementation, the similarity scores are based on the extent or degree to which the situational profile is similar to each of the plurality of assistance profiles. In this example, with an experienced driver on a road with few vehicles and no traffic congestion, the assistance profiles that most closely conform to the attributes and values in the situational profile receive the greatest similarity scores. So, an assistance profile with a combination of similar driver experience, road and traffic conditions, will yield higher similarity scores than an assistance profile with a novice driver in heavily congested traffic.

Figure 8:
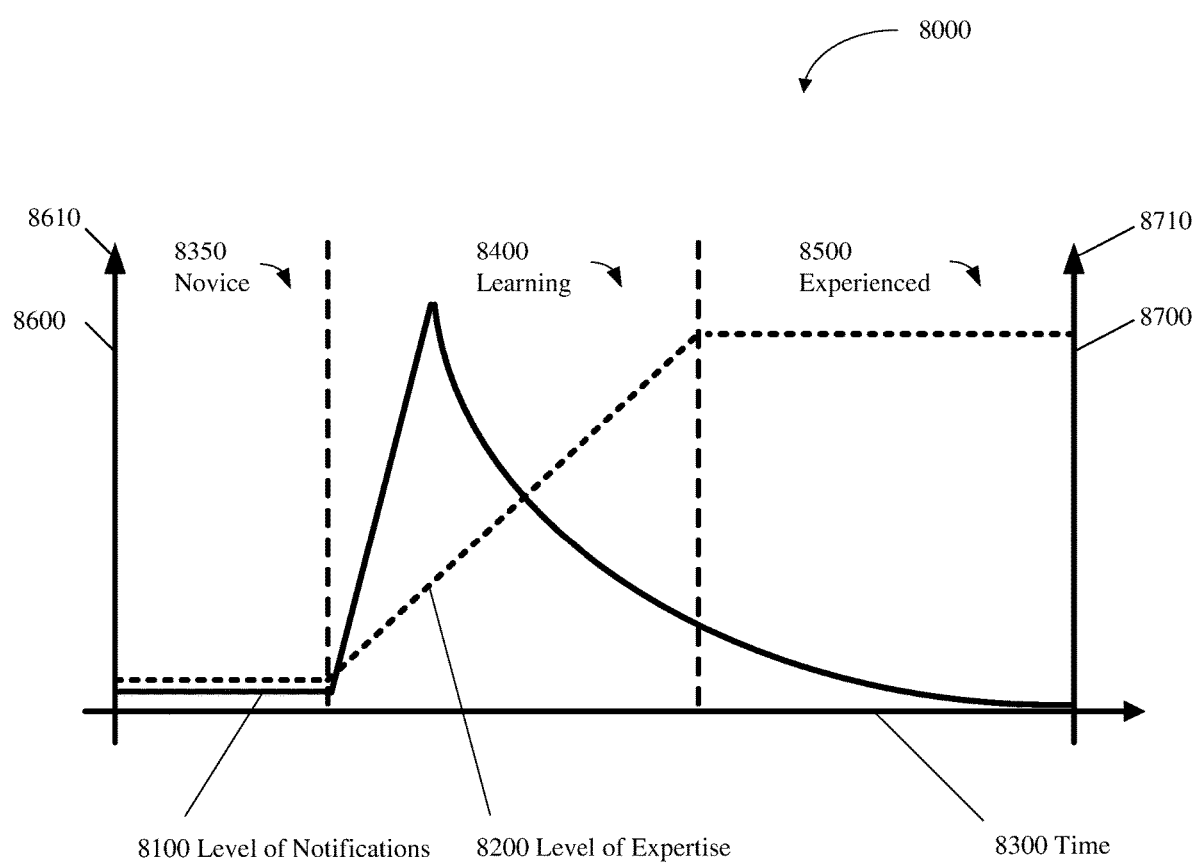
FIG. 8 is a graphical illustration of the frequency of tutorial notifications over time in accordance with this disclosure.

Use of the assistance profiles may be illustrated in FIG. 8, which includes a driver profile graph 8000 that depicts a level of notifications curve 8100 and a level of expertise curve 8200. In an implementation, as illustrated in driver profile graph 8000, the level of notifications curve 8100 represents a change in the level of notifications and the level of expertise curve 8200 represents changes in the level of expertise over time 8300 (a period of time), as a driver receives and uses notifications or assistance indications related to the use of a control system such as intelligent cruise control (ICC).

In an implementation, as shown in driver profile graph 8000, time period 8300 may be divided into time intervals, which may include: a novice time period 8350 to represent the initial or early stages of a driver learning about a control system such as ICC; a learning time period 8400 during which a driver has some experience in using the control system, during which time the level of notifications curve 8100 may significantly increase; and an experienced time period 8500 during which the level of notifications curve 8100 may be reduced.

In an implementation, notification level 8600 indicates the frequency or number of notifications or assistance indications that are generated. In an implementation, changes in the frequency or number of notifications may be indicated along the y-axis of notification level 8600, the direction indicated by arrow 8610 corresponding to an increase in the frequency or number of notifications or assistance indications. In an implementation, driver experience level 8700 indicates the level of driver experience for a driver, and in an implementation increases in driver experience may be indicated along the x-axis of driver experience level 8700, the direction indicated by arrow 8710 corresponding to an increase in driver experience.

In an implementation, the level of notifications may represent the level of complexity of a notification or assistance indication, which closely matches the level of expertise of the driver (as determined based on past driver interactions with the ICC). Accordingly, in an implementation, as the driver's experience level increases, so too does the level of notifications or assistance indications.

In an implementation, when the driver achieves a high level of experience or mastery over the control system, the notifications may be reduced or stopped. In this way, a driver may receive notifications or assistance indications according to their level of expertise. In an implementation, a driver with a low level of expertise, such as a novice driver, will not receive any assistance indications or notifications. In an implementation, as the driver's level of expertise increases, the frequency or level of notifications will increase. In an implementation, the rate at which the frequency or level of notifications increases may be based on the driver identity data or aggregate driver identity data. In an implementation, when the driver has reached a predetermined level of expertise, such as the experienced level of expertise, the assistance indications or notifications may be halted or reduced to a very low frequency.

In an implementation, various attributes or values in the situational profile and corresponding attributes or values in the plurality of assistance profiles may be weighted equally or unequally with a corresponding contribution to the similarity values that are generated. In an implementation, the weighting of the attributes or values in the situational profile may be related to the significance of the control system, so that learning to use assistive braking would be weighted as more significant than learning to use a vehicle entertainment system.

In an implementation, the similarity values are ranked or ordered from least to greatest, and the similarity between the situational profile and the plurality of assistance profiles is based on the assistance profile of the plurality of assistance profiles that corresponds to the greatest similarity value, which will also correspond to the usage frequency value of the plurality of usage frequency values.

In step 3300, the vehicle 1000 determines or selects a vehicle path for the vehicle and extra-vehicular paths for any extra-vehicular objects. In an implementation, the vehicle path is based on a number of vehicle path factors including the velocity of the vehicle, the orientation of the vehicle, and the driver identity data which may include driving patterns associated with a particular driver identity such as the locations that the vehicle has visited in the past. In an example, the driver identity data could include a work location, primary residence location, school location, or various other locations. Based on the location of the vehicle 1000 being in proximity to one of the previously visited locations, the vehicle path could be calculated to include the likelihood that the previously visited location is a potential destination.

In an implementation, the extra-vehicular paths include the paths of both moving extra-vehicular objects and stationary extra-vehicular objects which may be based on extra-vehicular path factors including the velocity of the extra-vehicular objects, orientation of the extra-vehicular objects, and extra-vehicular object identity data. In an implementation, the extra-vehicular object identity data may include sensory data (such as visual data or audible data) that may be used to identify the extra-vehicular objects. In this way, the path of an automobile stopped at a red light or stop sign may be determined even though the extra-vehicular object may have been in a prolonged stationary state. In an implementation, the sensory data may be used to identify entities, such as people or vehicles, that are stationary but may soon move, such as at stop sign, red light, or in heavy traffic. In this way an extra-vehicular path for an entity that is stationary, may be generated based on the existing or estimated traffic flow.

Figure 6:
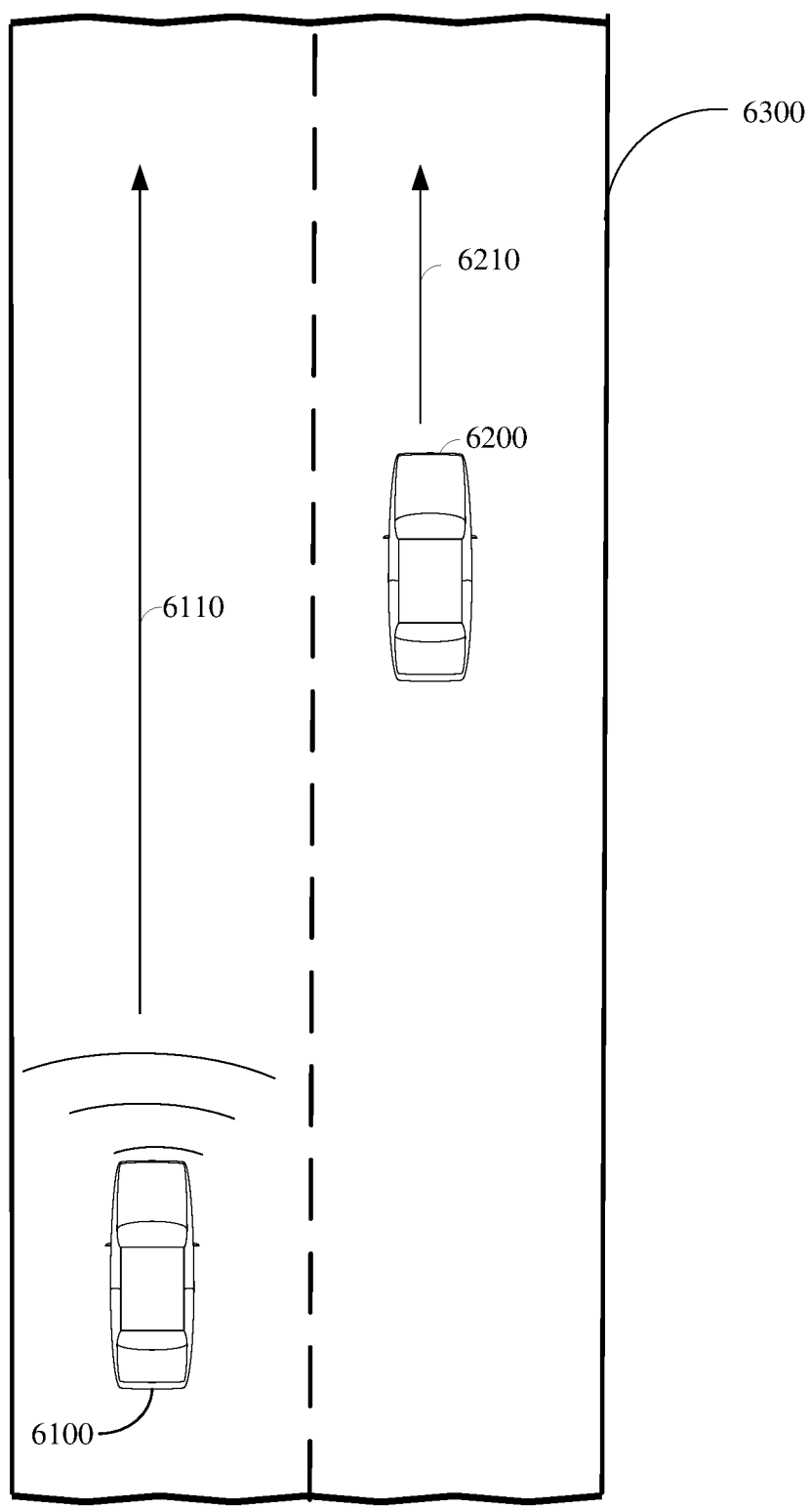
FIG. 6 is a diagram illustrating a vehicle utilizing the smart tutorial apparatus within a portion of a vehicle transportation network in accordance with this disclosure.
Figure 7:
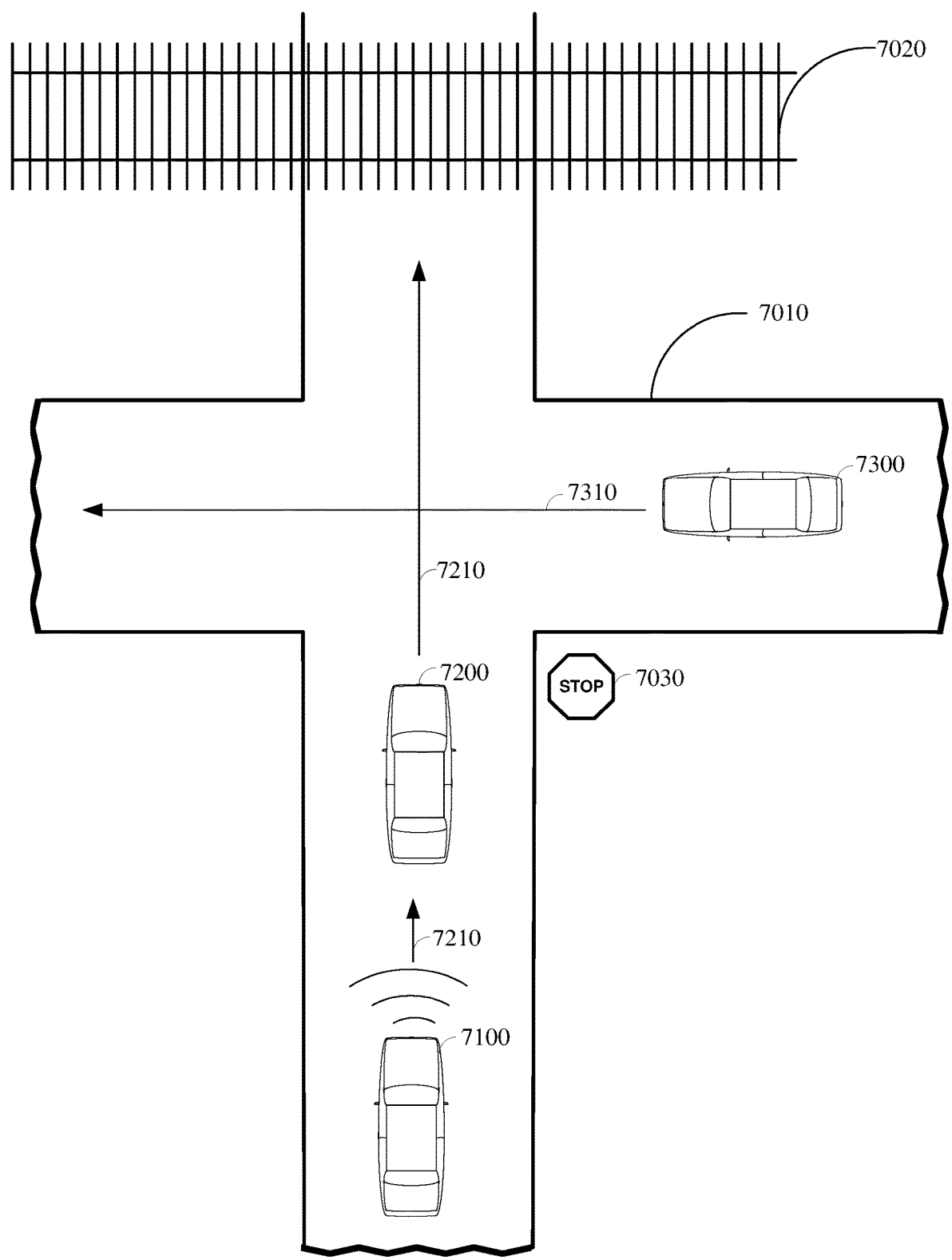
FIG. 7 is a diagram illustrating a vehicle utilizing the smart tutorial apparatus within a portion of a vehicle transportation network that includes other vehicles in accordance with this disclosure.

FIGS. 6 and 7 illustrate two scenarios for vehicle path determination and extra-vehicular path determination. In FIG. 6, the vehicle 6200, which is similarly equipped to vehicle 1000, is on two lane road 6100 with vehicle 6300. The sensors onboard vehicle 6200 indicate that only one other car is within sensor range (vehicle 6300) and based on the determined vehicle path for vehicle 6200 and the determined extra-vehicular path for vehicle 6300, the two vehicles will not intersect one another. In this scenario in FIG. 6, due to the non-intersecting vehicle path 6110 and extra-vehicular path 6210, an assistance instruction may be readily selected and the corresponding assistance indication generated.

In FIG. 7, a vehicle 7100 is following vehicle path 7210 and is in close proximity to vehicle 7200 which has stopped besides stop sign 7030 and will follow vehicle path 7210. Vehicle 7300 is following vehicle path 7310 which may intersect vehicle path 7210 if vehicle 7200 advances before vehicle 7300 passes vehicle 7200. Ahead of both vehicle 7100 and vehicle 7200 is a railway crossing 7020. In an implementation, the determined paths for vehicle 7100 and extra-vehicular objects including vehicle 7200 and vehicle 7300 includes an assessment of the traffic signage, such as "stop" signs or red lights, as well as the layout of roads 7010 and potential barriers such as railway crossings that become impassable at certain times, such as when a train crosses. In the scenario in FIG. 7, to avoid distracting the driver, an assistance instruction may not be selected and no assistance indication will be generated.

In step 3350, the vehicle 1000 determines when or if the vehicle path will intercept at least one of the extra-vehicular paths. In an implementation, the determination may be made by plotting the vehicle path and extra-vehicular paths at a specific position at a first time interval to a second position at a second time interval, such as from a current time to a time 10 seconds after the current time. Responsive to the determination that the vehicle path will intercept at least one of the extra-vehicular paths the Yes branch is taken to step 3400. Responsive to the determination that the vehicle path will not intercept at least one of the extra-vehicular paths, the No branch is taken to step 3450.

In step 3400, in response to the determination that the plotted vehicle path and at least one of the extra-vehicular paths may intersect at a future time, the vehicle 1000 may delay selecting an assistance instruction until after the vehicle path has been adjusted to avoid the extra-vehicular paths. In an implementation, the vehicle 1000 may delay a predetermined time after the vehicle path has been adjusted. In this way, the vehicle 1000 will not select an assistance instruction when a potential intersection of vehicle path and extra-vehicular paths may imminently occur. In an implementation, the vehicle 1000 may determine the distance between the vehicle 1000 and extra-vehicular objects. The vehicle 1000 may identify the extra-vehicular objects and not provide an assistance indication when the distance between the vehicle 1000 and the extra-vehicular objects is less than a threshold distance. In an implementation, the vehicle 1000 may provide an assistance indication, such as a visual or audible indication, of the potential for intersection of the vehicle path and one or more extra-vehicular paths.

In step 3450, the vehicle 1000 selects the assistance profile that is most similar to the situational profile, based on the assistance profile of the plurality of assistance profiles that corresponds to the greatest similarity value. Accordingly, the assistance profile corresponds to one of the plurality of assistance instructions. In an implementation, the assistance instruction comprises an indication of how and when the driver should operate the control system inputs to change the vehicle control states. In an implementation, the assistance instructions may include a series of instructions and the series of instructions may be selected on the basis of driver identity data such as the driver experience level data.

In an implementation, the control system inputs include any control system input that the driver is able to activate or deactivate to control the operation of the vehicle including any vehicle sub-systems. In an implementation the control system inputs include steering, acceleration, braking, lighting, or sound system, as well as more advanced control system inputs such as the control system inputs used to activate or deactivate predictive and intelligent systems such as autonomous driving, intelligent cruise control, predictive forward collision warning, lane departure prevention, intelligent braking assist, or blind spot warning.

In an implementation, the selection of the situational profile is contingent on the usage frequency value (that corresponds to the assistance profile) exceeding a usage frequency threshold value. In an implementation, the usage frequency value may be related to the amount of usage associated with the control system that corresponds to the assistance instruction. In an implementation, the usage frequency value may be incremented or decremented based on factors including the total number of times a corresponding assistance instruction has been selected, the frequency of generating the assistance indication, or how recently the assistance indication has been generated.

In an implementation, the usage frequency value may be assigned an initial value of 100 on a scale of 1 to 100. Over time, as the driver operates the vehicle 1000, the usage frequency value may be decremented each time an assistance indication is generated or acted upon by the driver. As such, the usage frequency value corresponding to the assistance instruction may diminish over time. When compared to a usage frequency threshold (which may have a fixed value), a frequently used control system will correspond to a usage frequency value that will eventually not exceed the usage frequency threshold, and the assistance indication will thereby not be generated.

In an implementation, the usage frequency threshold may be reduced to zero or a very low value based on the importance or safety value associated with the assistance instruction. For example, an assistance instruction corresponding to a situational profile in which the vehicle will imminently intercept another vehicle at high velocity may have a usage frequency threshold value of zero, so that the assistance instruction will always be selected and the corresponding assistance indication will always be generated.

In step 3500, the vehicle 1000 generates an assistance indication that corresponds to the selected assistance instruction. In an implementation, the assistance indication includes: an audible indication such as a chime, ring tone, or verbal instruction; visual indication such as a flashing light, colored light, or graphic display; or haptic indication such as a vibration. In this way the driver may be provided with one or more assistance indications that an assistance instruction is being provided or is about to be provided. In an example, a haptic motor may cause the steering wheel to vibrate when an assistance indication to activate intelligent cruise control (ICC) is generated. The intelligent cruise control input may be located on the steering wheel and haptic feedback on the steering wheel may direct the driver's attention to an area, such as the steering wheel, where the ICC input is located. Additionally, the ICC input may be illuminated when the assistance indication is generated, thereby facilitating activation or deactivation by the driver.

In an implementation, the usage frequency threshold value may be increased in response to the corresponding assistance instruction being provided as an assistance indication or when the assistance indication is acted upon by the driver. For example, the assistance instruction corresponds to a situational profile.

In an example, the vehicle 1000 may not provide an assistance indication explaining how to operate a sunroof in a car when an assistance indication including a tutorial on how to operate the sunroof in the car was previously generated and declined five minutes ago.

Figure 4:
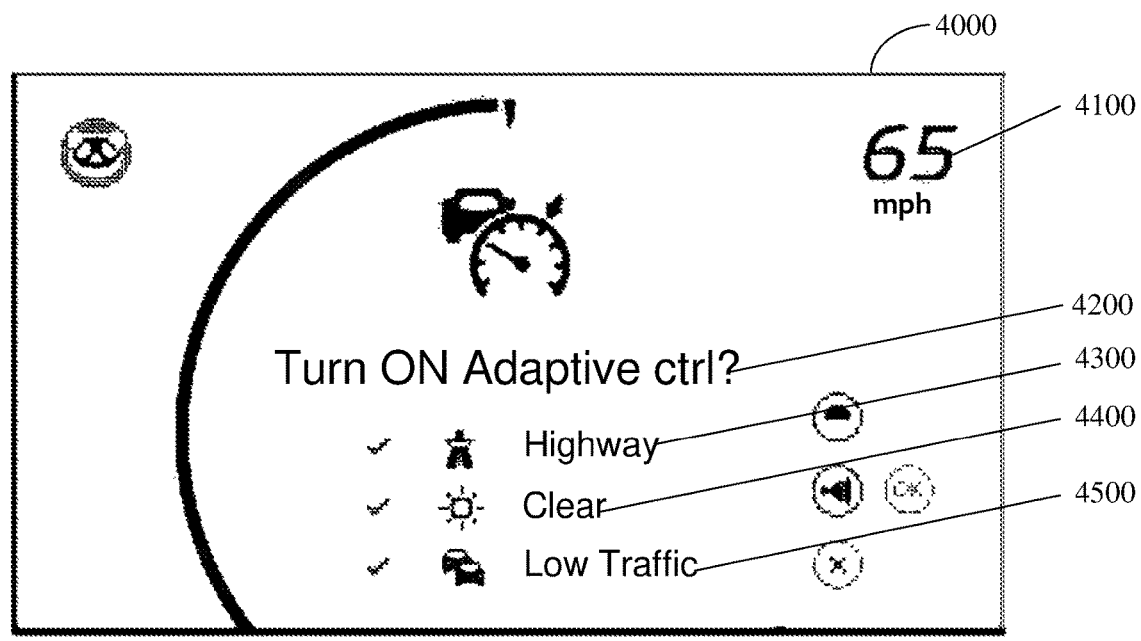
FIG. 4 is a diagram presenting a graphical illustration of an intelligent cruise control request via a graphical display in accordance with this disclosure.

FIG. 4 illustrates an assistance indication that may be generated on the user interface 1350, which in an implementation may be integrated into the dashboard or control panel of vehicle 1000. As illustrated in FIG. 4, the assistance instruction may be displayed on display unit 4000 which is a part of user interface 1350. In an implementation, the display unit 4000 shows: a vehicle velocity 4100; a written assistance indication 4200 requesting whether the driver would like to turn on the adaptive controls; an indication of highway conditions 4300 (checkmark); an indication of weather conditions 4400 (clear); and an indication of traffic conditions 4500 (low traffic).

In an implementation, the vehicle 1000 may access remote servers or cloud storage services to determine an assistance indication based on real-time or predicted traffic information, real-time weather information, and real-time highway information. In an implementation, the situational profile may be based on the real-time and predicted data from remote data sources. In an implementation, the situational profile may be based on sensor data from sensor 1360, which may be used to assess conditions external to the vehicle 1000. In an implementation, sensor 1360 includes a light sensor which may be used to measure sunlight entering the vehicle 1000 and thereby determine conditions on the vehicle transportation network such as road visibility.

In step 3550, vehicle 1000 determines when the driver identity data indicates autonomous systems control by the vehicle 1000 over the one or more control system inputs to change the vehicle control states. In an implementation, autonomous systems control includes automated control over operation of the vehicle, such as autonomous driving. Responsive to the vehicle 1000 determining that the driver identity data indicates autonomous systems control by the vehicle 1000, the Yes branch is taken to step 3600. Responsive to the vehicle 1000 determining that the driver identity data does not indicate autonomous systems control by the vehicle 1000, the No branch is taken to step 3650.

In step 3600, in response to the vehicle 1000 determining that the driver identity data indicates autonomous systems control by the vehicle 1000, the vehicle 1000 activates or deactivates one or more of the control systems in accordance with the selected assistance instruction. In an implementation, the vehicle may provide a notification indication to the driver that includes a visual indication, audible indication (such as a verbal instruction or musical tone), or haptic indication that the vehicle 1000 will activate or deactivate a control system. In an implementation, the vehicle may require confirmation from the driver before activating or deactivating the control system. When the driver identity data indicates autonomous systems control by the vehicle 1000, the method 3000 returns to step 3050 to generate a new situational profile.

In step 3650, the vehicle 1000 determines whether a feedback input was detected. In an implementation, the feedback input activates the control system inputs. In an implementation, a feedback input includes any type of action or input by the driver including a control system input, gesture, or vocalization indicating whether an assistance instruction should be performed. In an implementation, the feedback may be detected by sensor 1360, which may include a microphone and voice recognition system to capture voice input by a driver, determine what the driver is communicating, and thereby generate a relevant assistance instruction or assistance indication. Responsive to the vehicle 1000 determining that a feedback input was detected, the Yes branch is taken to step 3700. Responsive to the vehicle 1000 determining that a feedback input was not detected, the No branch is taken to step 3850.

In step 3700, vehicle 1000 determines, based on the feedback, including the type of feedback or the timing of the feedback, when the feedback input is in accordance with the assistance indication. In an implementation, when the feedback occurs within a predetermined time period of generating the assistance indication, and the feedback corresponds to the assistance instruction, then the feedback is determined to have occurred in accordance with the assistance indication. In an example, if the assistance indication included an audible indication to activate the windshield wiper control system and the driver responded by activating the windshield wiper control system within 4 seconds, then the feedback (activating the windshield wiper control system) would be determined to have occurred as a result of the assistance indication.

Figure 5:
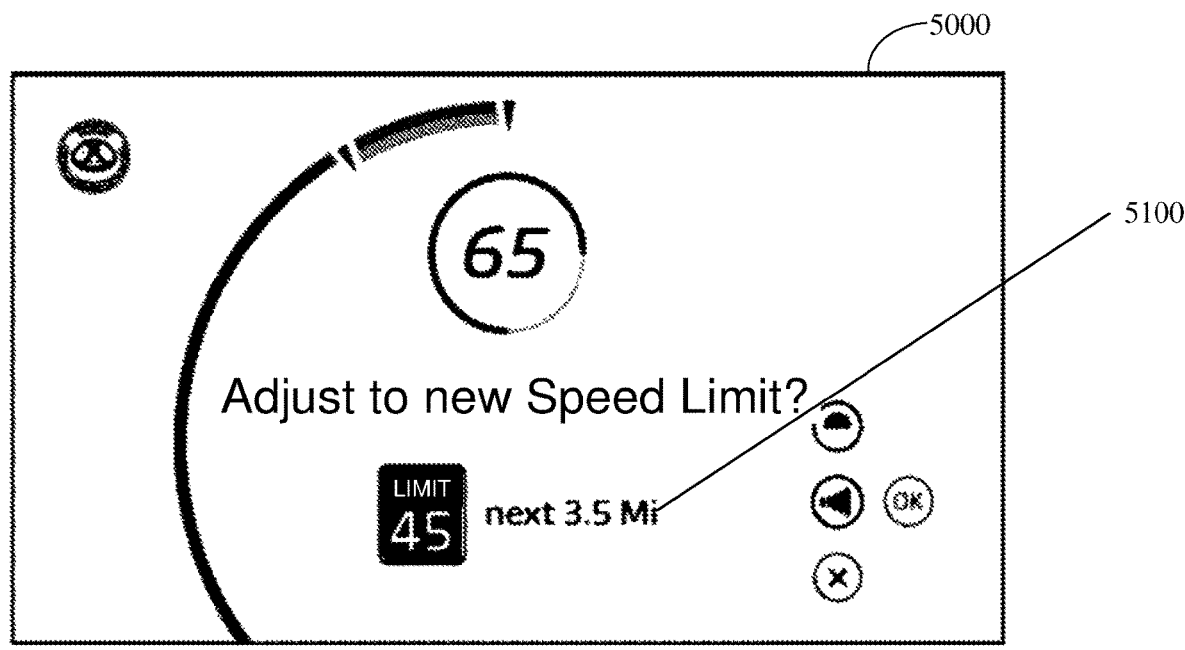
FIG. 5 is a diagram presenting a graphical illustration of speed adjustment request via a graphical display in accordance with this disclosure.

FIG. 5 illustrates an assistance indication that could prompt the driver of vehicle 1000 to provide a feedback input. In FIG. 5, the assistance indication 5100 ("Adjust to new speed limit") may be displayed on display unit 5000. In an implementation, the assistance indication may be based on real-time speed limit data which may be accessed through remote computing devices. In an implementation, extra-vehicular data may include traffic regulations such as speed limits, the location corresponding to the traffic regulations, and extra-vehicular data gathered from the aggregate extra-vehicular data.

Conversely, in an alternative implementation, if the windshield wiper control system is activated 30 minutes after the assistance indication was generated, then the feedback input would not be determined to have occurred as a result of the assistance indication.

When the vehicle 1000 determines that the feedback is not in accordance with the assistance indication, the No branch is taken to step 3050 to generate a new situational profile. Responsive to the vehicle 1000 determining that the feedback is in accordance with the assistance indication, the Yes branch is taken to step 3750.

In step 3750, in response to the feedback input being in accordance with the assistance instruction, the vehicle 1000 generates a new assistance profile based on the situational profile. In an implementation, generating the new assistance profile includes converting the situational profile into a new assistance profile. In an implementation, the new assistance profile is generated or converted to have the same format as the plurality of assistance profiles, so that the number and type of attributes in the new assistance profile will correspond to the number and type of attributes in the plurality of assistance profiles.

In step 3800, the vehicle 1000 adds the new assistance profile to the plurality of assistance profiles. In this way, the vehicle 1000 may learn and adapt based on the driver's feedback, thereby improving the relevance and quality of assistance instructions. After adding the new assistance profile, the method 3000 returns to step 3050 to generate a new situational profile.

In step 3550, after generating the indication, the vehicle 1000 may perform an assistance action such as activating or deactivating the control system inputs in accordance with the selected assistance instruction. In an implementation, an assistance instruction to activate ICC may be followed by activation of the ICC system by the smart tutorial system when an affirmative feedback is received from the driver. In an implementation, the affirmative feedback may be an audible indication from the driver.

In step 3850, the vehicle 1000 may modify the driver identity data when one or more of the control system inputs is determined to be in accord with the assistance indication. In an implementation, as discussed above, the determination of whether the one or more of the control system inputs is activated in response to an assistance instruction may be based on the time interval between generating the assistance indication and receiving the control system input from the driver. In an implementation, vehicle 1000 includes a machine learning system that modifies the driver identity data based on the situational profile and the driver identity data.

Figure 9:
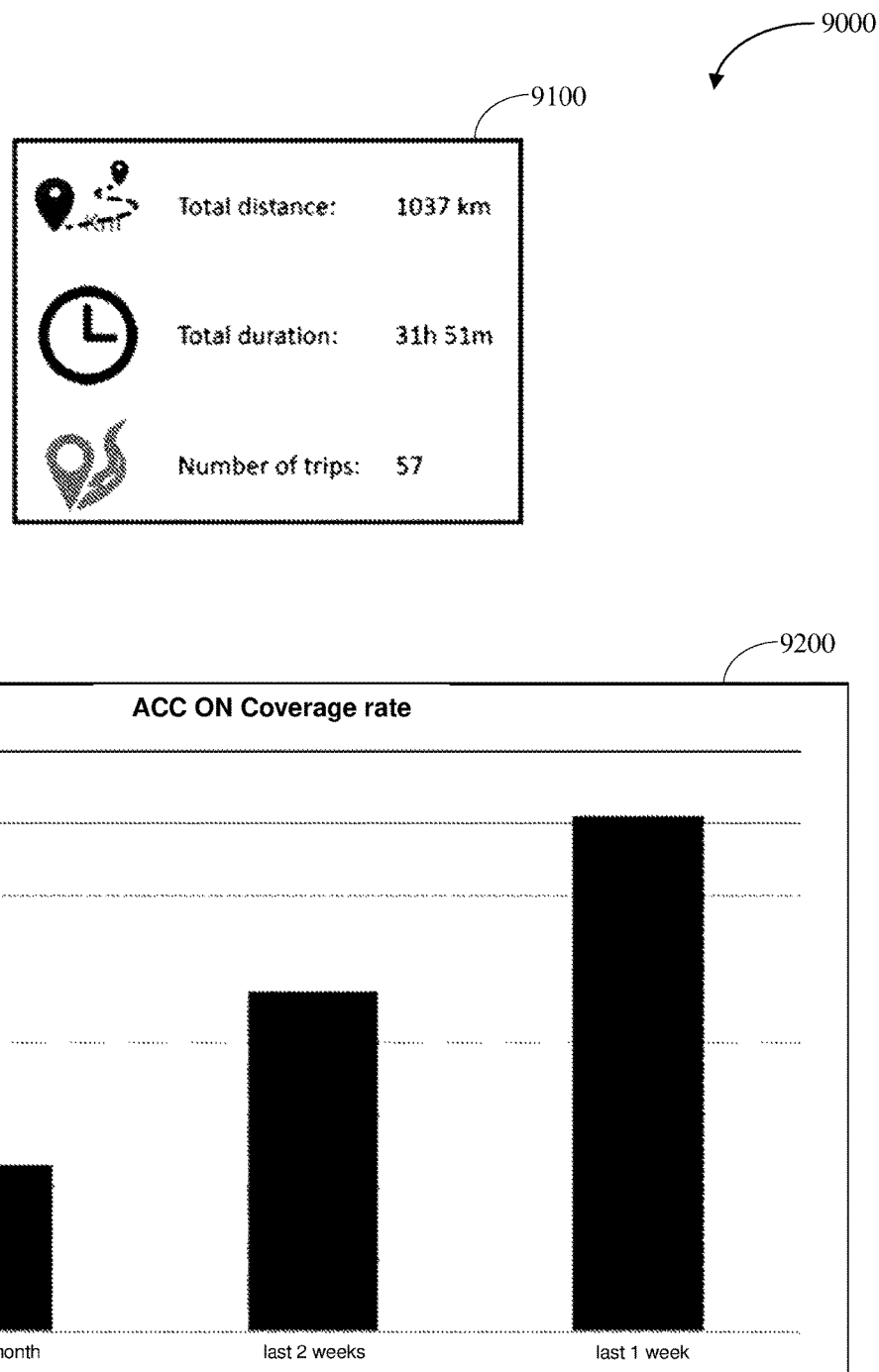
FIG. 9 is a graphical illustration of experimental data based on use of the smart tutorial apparatus in accordance with this disclosure.

FIG. 9 illustrates experimental data 9000, gathered from a vehicle such as the vehicle 1000. Experimental data 9000 includes data collected from the vehicle including the probability that a controller, such as controller 1300, was able to select a correct or appropriate assistance instruction relating to activation of automatic cruise control (ACC). In an implementation, a correct or appropriate assistance instruction is an assistance instruction that corresponds to actual usage of a control system (ACC) by a driver. Driving summary 9100 shows a summary of the distance, driving duration, and number of trips taken by the vehicle over the course of the experimental time period. As illustrated in driving summary 9100, the vehicle traversed a total distance of 1037 km, was in operation for a total duration of 31 hours 51 minutes, and was used for a total of 57 trips. As indicated in bar graph 9200, the rate of selecting a correct assistance instruction increased substantially over the course of less than one month, from less than 25% to more than 70%.

In an implementation, the modification of the driver identity data may include increasing the driver experience value when one or more of the control system inputs is activated in response to the assistance instruction.

In an implementation, the modification of the driver identity data may include reducing the usage frequency threshold value in response to the driver experience value being increased. In this way, in response to an increase in the total number of times a control system input is activated or deactivated increases, or more frequent use of a feature associated with a control system input, the vehicle 1000 may increase a driver experience level. After modifying the driver identity data, the method 3000 returns to step 3050.

Although the disclosure describes a single vehicle as the source of the vehicle 1000 actions, other types of vehicles may be configured to perform the steps of the smart tutorial as shown in FIG. 3.

The disclosed technology offers the advantages of a vehicle that provides relevant and timely tutorials to better acquaint a driver with features of the vehicle. In addition to enhancing the driving experience, the disclosed technology may reduce wear and tear on the vehicle through driver education and training in the use of underutilized features that may prolong vehicle longevity. Further, the disclosed technology may result in improved performance of the vehicle by familiarizing the driver with energy saving technologies and other features of the vehicle that optimize vehicle operation.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of operating a vehicle, the method comprising:
    generating, by a processor, a situational profile for the vehicle including driver identity data, wherein the driver identity data includes respective usage frequency values corresponding to a plurality of assistance instructions;
    comparing, by the processor, the situational profile for the vehicle to a plurality of assistance profiles including aggregate identity data corresponding to the driver identity data;
    generating, by the processor and based on comparing the situational profile for the vehicle to the plurality of assistance profiles, a plurality of similarity values corresponding to the plurality of assistance profiles indicating a level of similarity between the situational profile for the vehicle and a respective assistance profile of the plurality of assistance profiles; and
    selecting, by the processor, an assistance instruction of the plurality of assistance instructions depending upon a similarity value of the plurality of similarity values and a usage frequency value that corresponds to the assistance instruction, wherein the assistance instruction is associated with one or more control system inputs for changing a control state of the vehicle.

2. The method of claim 1, further comprising:
    updating the usage frequency value that corresponds to the assistance instruction within the driver identity data.

3. The method of claim 2, wherein updating the usage frequency value occurs responsive to use of the assistance instruction.

4. The method of claim 1, further comprising:
    detecting whether the driver identity data indicates autonomous systems control by the vehicle; and
    activating or deactivating one or more control systems of the vehicle in accordance with the selected assistance instruction responsive to detecting that the driver identity data indicates autonomous systems control by the vehicle.

5. The method of claim 4, further comprising:
    providing a notification indication to the driver that the vehicle will be activating or deactivating the one or more control systems before activating or deactivating the one or more control systems; and
    awaiting confirmation from a driver before activating or deactivating the one or more control systems.

6. The method of claim 1, further comprising:
    generating an assistance indication that corresponds to the selected assistance instruction; and
    determining whether the selected assistance instruction is performed responsive to the assistance indication.

7. The method of claim 6, wherein determining whether the selected assistance instruction is performed comprises:
    detecting a feedback input indicating whether the selected assistance instruction is performed responsive to the assistance indication.

8. The method of claim 1, further comprising:
    generating, by the processor, an assistance indication based on the assistance instruction, wherein the assistance indication includes at least one of audible indication, a visual indication, or a haptic indication.

9. An apparatus for operating a vehicle, the apparatus comprising:
    a non-transitory memory; and
    a processor configured to execute instructions stored in the non-transitory memory to:
        generate a situational profile for the vehicle including driver identity data, wherein the driver identity data includes respective usage frequency values corresponding to a plurality of assistance instructions;
        compare the situational profile for the vehicle to a plurality of assistance profiles including aggregate identity data corresponding to the driver identity data;
        generate, based on a comparison between the situational profile for the vehicle and the plurality of assistance profiles, a plurality of similarity values corresponding to the plurality of assistance profiles indicating a level of similarity between the situational profile for the vehicle and a respective assistance profile of the plurality of assistance profiles; and
        select an assistance instruction of the plurality of assistance instructions depending upon a similarity value of the plurality of similarity values and a usage frequency value that corresponds to the assistance instruction, wherein the assistance instruction is associated with one or more control system inputs for changing a control state of the vehicle.

10. The apparatus of claim 9, wherein the plurality of assistance profiles comprises data representing changes in a level of expertise of a driver over time and data representing changes in a level of notification of an assistance instruction for a control system over time.

11. The apparatus of claim 10, wherein the data representing changes in a level of notification of an assistance instruction for a control system over time comprises a first level of notification of the assistance instruction during a first time interval, a second level of notification of the assistance instruction during a second time interval after the first time interval, and a third level of notification of the assistance instruction during a third time interval after the second time interval, the second level of notification increases over time during the second time interval from the first level of notification to a value higher than the first level of notification and decreases thereafter to the third level of notification at a start of the third time interval, the third level of notification decreasing over time to a value below the first level of notification.

12. The apparatus of claim 9, wherein the instructions further comprise instructions to:
    select the assistance instruction of the plurality of assistance instructions having a highest similarity value based on comparing the plurality of similarity values and having a usage frequency value exceeding a usage frequency threshold value.

13. The apparatus of claim 9, wherein the situational profile includes vehicle state data and extra-vehicular state data, and the instructions further comprise instructions to:
    determine a vehicle path of the vehicle using the vehicle state data;

determine an extra-vehicular path of a remote vehicle using the extra-vehicular state data;
compare the vehicle path with the extra-vehicular path; and
determine whether to generate an assistance indication corresponding to the assistance instruction based on a result of comparing the vehicle path with the extra-vehicular path.

14. The apparatus of claim 13, wherein the instructions to determine whether to generate the assistance indication comprise instructions to:
responsive to a determination that the vehicle path will intercept the extra-vehicular path within a defined amount of time, generate the assistance indication after a delay.

15. The apparatus of claim 14, wherein the instructions to generate the assistance indication after the delay comprise instructions to generate the assistance indication after adjustment of the vehicle path.

16. The apparatus of claim 13, wherein the instructions to compare the vehicle path with the extra-vehicular path comprises instructions to determine a distance between the vehicle and the remote vehicle, and the instructions to determine whether to generate the assistance indication comprise instructions to generate the assistance indication unless the distance is less than a threshold distance.

17. The apparatus of claim 9, wherein the instructions further comprise instructions to:
access at least one of remote servers or cloud storage services to determine an assistance indication based on at least one of real-time or predicted traffic information, real-time weather information, or real-time highway information; and
generate an assistance indication corresponding to the assistance instruction based on a result of accessing the at least one of the remote servers or cloud storage services.

18. The apparatus of claim 9, wherein the instructions further comprise instructions to:
obtain an adversity status value associated with at least one of geographical condition data, weather forecast data, traffic condition data, traffic incident data, or vehicle transportation network data; and
update, based on the adversity status value, a usage frequency threshold value used for comparison with the usage frequency value to select the assistance instruction.

19. The apparatus of claim 9, wherein the instructions further comprise instructions to:
detect a feedback input that reflects a change in the control state of the vehicle;
determine whether the feedback input is in accordance with the assistance indication based at least in part on the feedback input occurring before a predetermined time period has elapsed after generating the assistance indication; and
in response to the feedback input being in accordance with the assistance instruction, convert the situational profile for the vehicle into a format that corresponds to the plurality of assistance profiles and adding the situational profile to the plurality of assistance profiles.

20. The method of claim 1, further comprising:
detecting a feedback input that reflects a change in the control state of the vehicle;
determining whether the feedback input is in accordance with the assistance indication based at least in part on the feedback input occurring before a predetermined time period has elapsed after generating the assistance indication; and
in response to the feedback input being in accordance with the assistance instruction, converting the situational profile for the vehicle into a format that corresponds to the plurality of assistance profiles and adding the situational profile to the plurality of assistance profiles.

* * * * *